United States Patent
Luig et al.

(10) Patent No.: US 6,880,963 B2
(45) Date of Patent: Apr. 19, 2005

(54) LUMINAIRE

(75) Inventors: Wilfried Luig, Soest (DE); Stefan Volpert, Nottuln (DE)

(73) Assignee: CEAG Notlichtsysteme GmbH, Soest (DE)

(*) Notice: Subject to any disclaimer, the term of this patent is extended or adjusted under 35 U.S.C. 154(b) by 16 days.

(21) Appl. No.: 10/188,371

(22) Filed: Jul. 3, 2002

(65) Prior Publication Data

US 2003/0043595 A1 Mar. 6, 2003

(30) Foreign Application Priority Data

Sep. 4, 2001 (DE) .................................... 201 14 561 U

(51) Int. Cl.[7] ............................................. G09F 13/18
(52) U.S. Cl. ...................... 362/560; 362/230; 362/404; 362/555
(58) Field of Search ................... 362/560, 555, 362/559, 31, 391, 812, 800, 407, 404, 249, 235, 230, 231, 267; 40/546, 581

(56) References Cited

U.S. PATENT DOCUMENTS 2,623,313 A * 12/1952 Fuchs ........................ 40/546
5,027,258 A * 6/1991 Schoniger et al. ............ 362/31
6,517,222 B1 * 2/2003 Orlov ......................... 362/391

FOREIGN PATENT DOCUMENTS

| DE | 94 12 926 U | 11/1994 |
| DE | 195 12 370 A | 10/1996 |
| DE | 200 11 632 U | 10/2000 |
| DE | 200 16 191 U | 3/2001 |
| EP | 0 721 086 A | 7/1996 |
| WO | 98 52181 A | 11/1998 |

* cited by examiner

*Primary Examiner*—Alan Cariaso
*Assistant Examiner*—Guiyoung Lee
(74) *Attorney, Agent, or Firm*—Fish & Richardson P.C.

(57) ABSTRACT

A luminaire includes a frame member, an inner panel, light emitting diodes (LEDs), an information carrier, and two outer panels. The inner panel has two surfaces and edges that join the two surfaces such that the inner panel is able to reflect light substantially perpendicularly to its two surfaces. The LEDs are arranged along at least one edge of the inner panel and are detachably attached to the frame member. The information carrier is associated with at least one surface of the inner panel. The two outer panels are associated with the two surfaces of the inner panel. To protect the luminaire against environmental influences and at the same time to maintain the optical appearance of the luminaire, the inner panel and the two outer panels are held by the frame member for water-tight encapsulation.

27 Claims, 3 Drawing Sheets

LUMINAIRE

TECHNICAL FIELD

This description relates to luminaires.

BACKGROUND

Luminaires serve, for example, as safety luminaires and as life-saving indicator luminaires that mark escape routes, for example, in buildings.

SUMMARY

In one general aspect, a new luminaire includes a frame member, an inner panel, light emitting diodes (LEDs), an information carrier, and two outer panels. The inner panel has two surfaces and edges that join the two surfaces such that the inner panel is able to reflect light substantially perpendicularly to its two surfaces. The LEDs are arranged along at least one edge of the inner panel and are detachably attached to the frame member. The information carrier is associated with at least one surface of the inner panel. The two outer panels are associated with the two surfaces of the inner panel. To protect the luminaire against environmental influences and at the same time to maintain the optical appearance of the luminaire, the inner panel and the two outer panels are held by the frame member for water-tight encapsulation.

Implementations may include one or more of the following features. For example, the LEDs may be arranged along an edge of a corresponding inner panel and the light emitted by the LEDs may be reflected through the inner panel substantially perpendicular to the surfaces thereof. The association of an information carrier to a side surface of the inner panel may be implemented directly by applying a corresponding pictograph to a side surface.

The luminaire may also include a light reflector provided along the free edge of the inner panel. The light reflector may include reflectors formed along the edge of the inner panel or adhered to the edge of the inner panel. The light reflector also may comprise a light-reflecting adhesive band.

The inner panel may be a transparent plastic panel and may be made of acrylic resin.

To avoid attaching and connecting the LEDs separately, the LEDs may be arranged on a substantially strip-shaped printed circuit board. This printed circuit board may be arranged along a corresponding edge of the inner panel at the frame member, such that a sufficient number of LEDs is provided to illuminate the inner panel in an overall favorable manner.

The frame member may include a U-shaped carrier having U-legs. The LEDs may be arranged between the U-legs such that the U-legs partially laterally grip the inner panel when the inner panel is installed in the frame member.

The U-shaped carrier may be formed of a metal rail provided with a reflection layer. The U-shaped carrier may be formed of plastic, such that a corresponding reflection layer is at least applied on the inner side of the U-legs. The light reflector may cover the U-shaped carrier at its open ends.

Usually, the safety and life-saving indicator luminaires are rectangular so that the frame member may also be substantially four-sided (for example, square or rectangular) and may be arranged along a side of the U-shaped carrier. To safely hold the inner and outer panels, the frame member may fully encompass the inner and outer panels along their edges.

The information carrier may be formed as a pictograph arranged outwardly on at least one outer panel. The pictograph may be directly formed on the outer side or it may be applied thereon as a foil. The information carrier also may be arranged as a foil pictograph between the inner and the outer panel. The information carrier may be formed separately to the outer and inner panel, and arranged as an information panel with a pictograph between the inner and outer panel. The information carrier may include two portions arranged on both or either sides of the inner panel.

To obtain the impression when looking at the luminaire that the luminaire is formed in one piece, the inner and outer panels may be adhered to each other on their entire surfaces. Likewise, at least the outer panels may be heated to such an extent that their inner surfaces get soft or form a liquid and can be subsequently welded to the other panels and in particular to the inner panel. If the one or more information panels are arranged between the outer panel and the inner panel, side surfaces of these panels may be heated correspondingly and welded together.

All components, and in particular the frame member and the inner and outer panels, may be formed of the same plastic material, such as, for example, acrylic resin.

To hang up the luminaire in a simple manner on a ceiling, the frame member may be hung up through a wire-like suspension element on a ceiling or any other surface. The voltage supply to the LEDs may be provided through the suspension element. In this way, the wire-like suspension element may be dimensionally stable such that the luminaire may be attached to a wall, for example, if the wires forming the suspension element have a sufficient stability.

The suspension element may include two wire ropes that are attached at a side edge of the frame member. If the luminaire is suspended from a ceiling, the attachment of the wire ropes is correspondingly implemented on an upper side edge of the frame member.

To quickly and simply connect the wire ropes during installation, connecting bolts may be used to attach the wire ropes through two bores in a side edge of the frame member. The connecting bolts may be connected to the LED printed circuit board. The connecting bolts thus serve to attach the wire ropes at the frame member and to establish an electrical connection between the voltage-supplying wire ropes and the LEDs.

The LEDs may be white to obtain a favorable illumination and a favorable visibility of the luminaire. In some implementations, some or all of the LEDs may be colored. The colored LEDs may correspond to the color of the information carrier. In this way, if the corresponding pictograph is, for example, green, then some of the LEDs may be colored green and placed among the white LEDs.

To make the appearance of the luminaire more compact and to improve it optically, a thickness of the frame member may substantially correspond to the sum of the thicknesses of all of the panels (including the inner panel and the outer panels) for the positive arrangement of these panels in the frame member.

The luminaire may be configured to protect the LEDs and the information carrier against outer or environmental influences while simultaneously providing an attractive and highly visible appearance. By laterally attaching the two outer panels (which are transparent), the inner panel is at least protected laterally and correspondingly it is encapsulated in a water-tight manner. The outer panels may in this connection also laterally protect the LEDs in addition to the frame member so that they are protected against outer influences.

The information carrier may be arranged in a versatile and protected manner.

The light reflector provided along the free edge of the inner panel prevents scattered light from emerging along the edges of the inner panel. The free edges of the inner panel are those edges to which LEDs are not arranged. Costs associated with the luminaire may be reduced when an inexpensive light-reflecting adhesive band is used to form the light reflector. The light reflector covers the open ends of the U-shaped carrier and therefore permits a simpler design of the U-shaped carrier while still reflecting the scattered light of the LEDs.

The luminaire is made to be relatively scratch-proof but still optically transparent, particularly if the inner panel is made of a transparent plastic panel made of acrylic resin.

The arrangement of the LEDs in the U-legs of the U-shaped carrier protects the LEDs from the outer panels and directs scattered light of the LEDs into the inner panel.

The luminaire does not appear to an observer to have panels that are formed or arranged adjacently, possibly with interposition of corresponding foil pictographs, particularly when the panels are heated and welded to other panels. Such a design leads to an improved optical impression and possibly to an improved light emission due to the exclusion of air between the individual panels.

Because the components of the luminaire may be formed of the same plastic material, the manufacture of the luminaire may be standardized.

When the voltage supply is connected to the LEDs through the suspension element, further electrical lines to the luminaire are not required.

The luminaire may appear to be made of one piece with encapsulated LEDs. Furthermore, the suspension of the luminaire may establish the electrical connection and thus reduce the number of visible wires. Thus, a separate housing for the luminaire is not required, and, through water-tight encapsulation of all parts of the luminaire, the luminaire may also be used as an emergency luminaire or as an exit luminaire.

Other features will be apparent from the description, the drawings, and the claims.

DESCRIPTION OF DRAWINGS

Like reference symbols in the various drawings indicate like elements.

DETAILED DESCRIPTION

Figure 1:
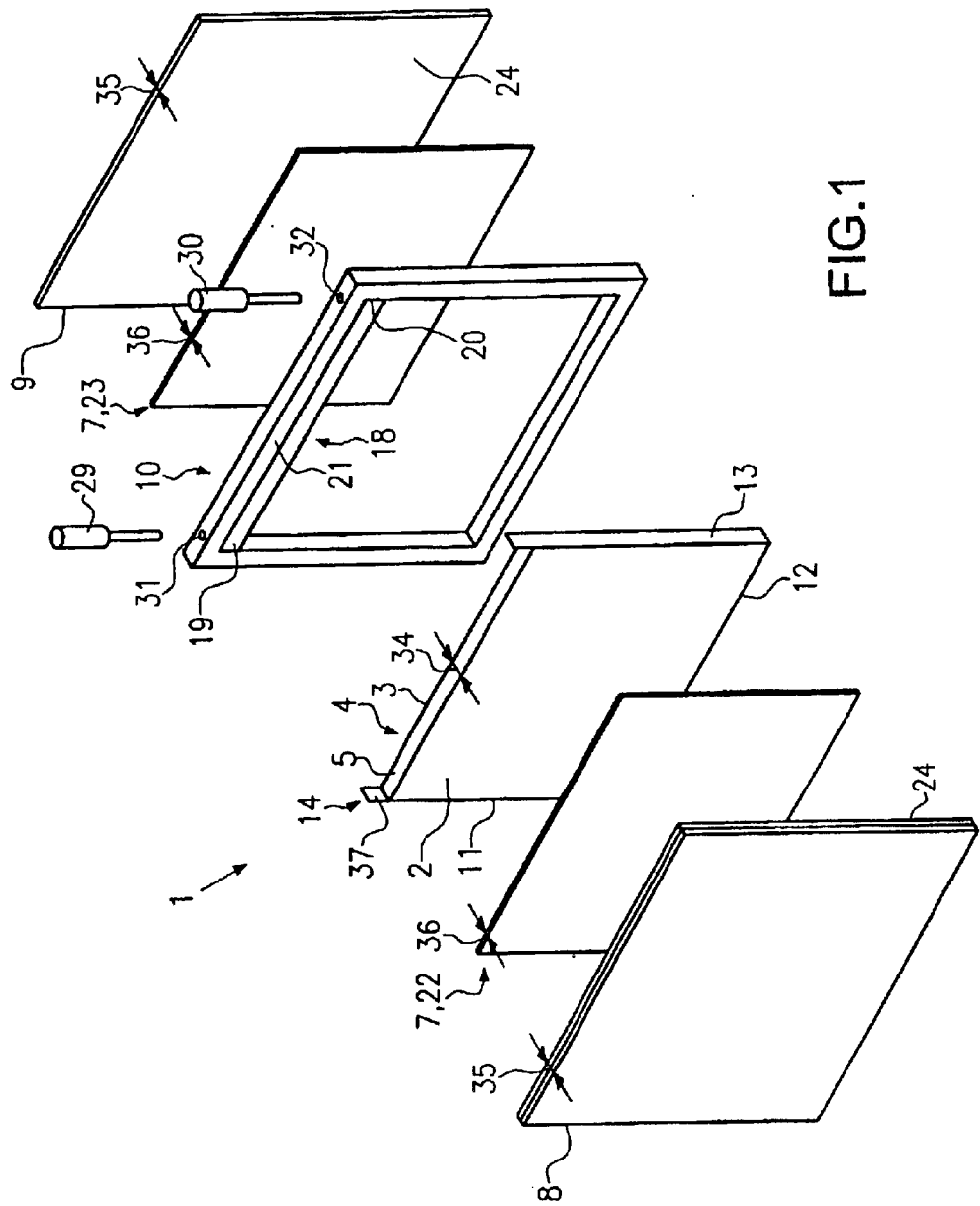
FIG. 1 shows an exploded perspective view of a luminaire.
Figure 2:
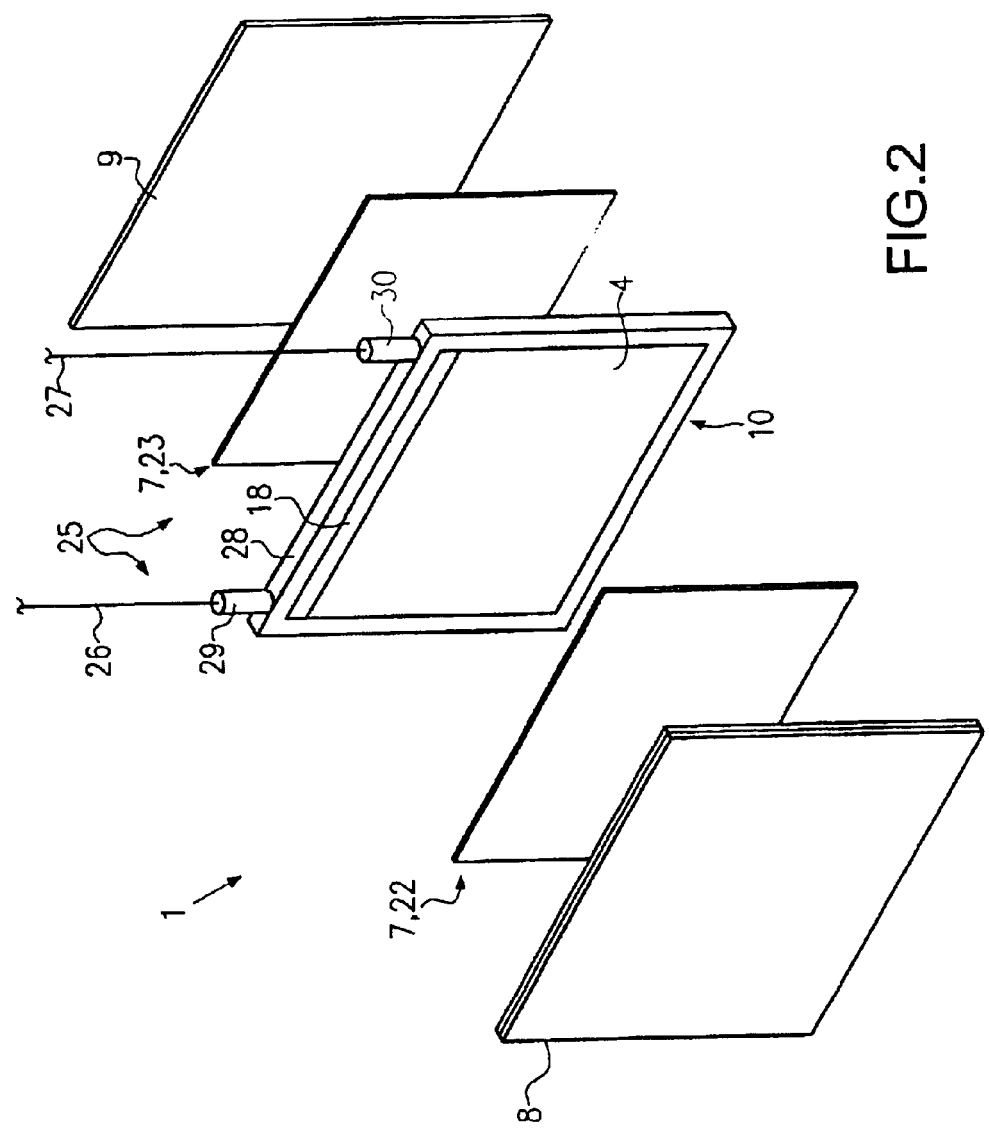
FIG. 2 shows an exploded perspective view of the luminaire of FIG. 1, in which an inner panel and connecting bolts are already attached to a frame member.
Figure 3:
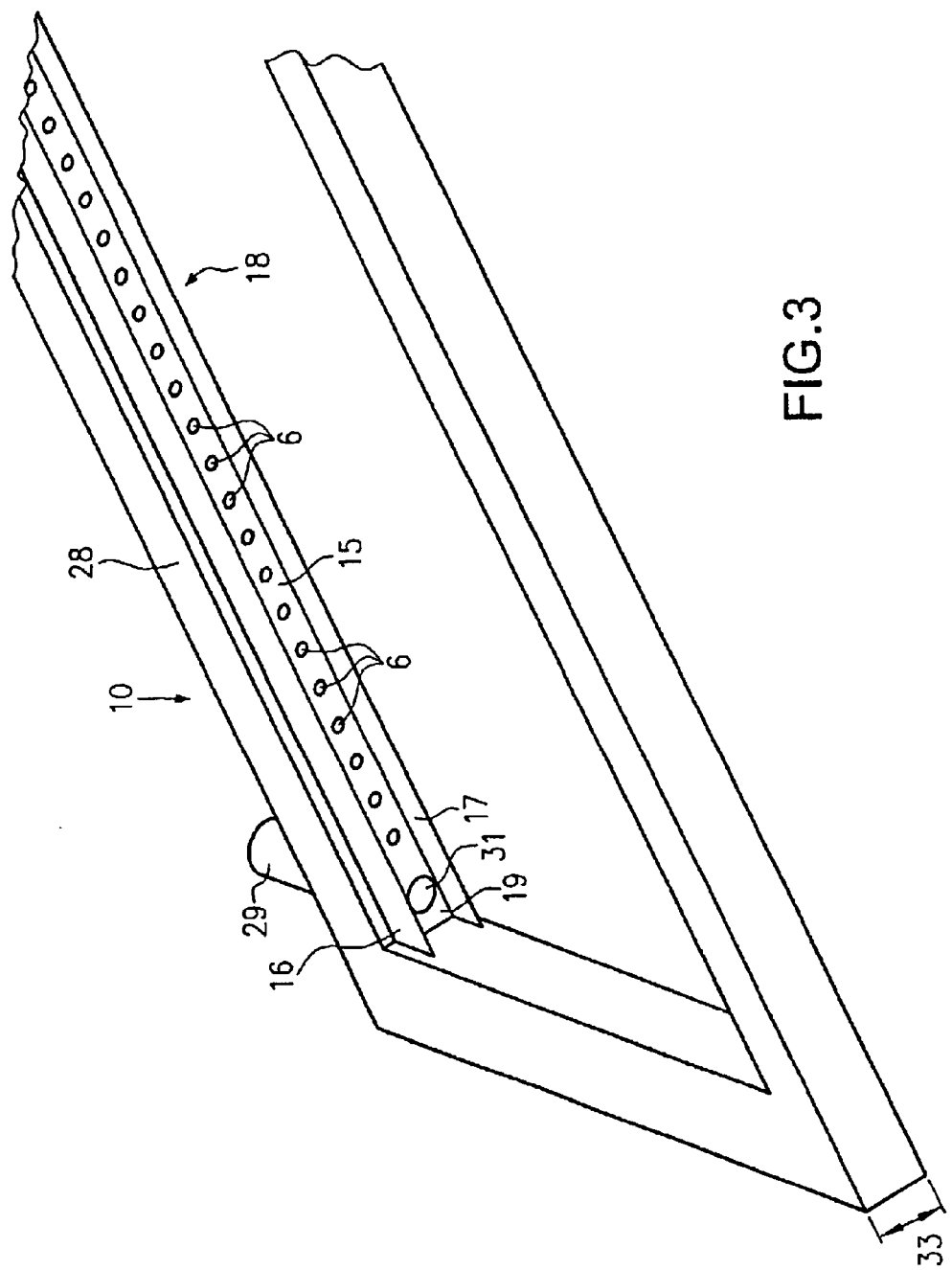
FIG. 3 shows a perspective view of the frame member of the luminaire of FIG. 1.

Referring to FIGS. 1–3, a luminaire 1 includes a frame member 10, which has a substantially rectangular shape. The luminaire further includes a U-shaped carrier 18 arranged along an upper side 21 of the frame member 10 on the inner side thereof. The U-shaped carrier 18 includes U-legs 16 and 17 (best viewed in FIG. 3) that point away from the side 21 of the frame member 10. The luminaire also includes light emitting diodes (LEDs) 6 arranged between the U-legs 16 and 17 (best viewed in FIG. 3). The luminaire includes an inner panel 4 having two opposing disk-like surfaces 2 and 3 and a light reflector 14 that is arranged along edges 11, 12, and 13 of the inner panel 4. The frame member 10 may be made, for example, of acrylic resin, as may the inner panel 4.

In operation, the light from the LEDs 6 enters the opposing surfaces 2 and 3 above the upper edge of the disk-like surfaces and is reflected laterally from the inner panel 4. The light reflector 14 reflects light emerging from the edges 11, 12, and 13 back to the inner panel 4.

The light reflector 14 may be formed as a reflecting adhesive band, such as, for example, a reflector. The light reflector 14 includes projections 37 that project upwardly over an upper edge 5 of the inner panel 4. The U-shaped carrier 18 is open on its lateral ends 19 and 20 and a gap is formed between the lateral ends 19 and 20 and the frame member 10. The projections 37 of the light reflector 14 engage this gap. Additionally, the upper edge 5 of the inner panel 4 is inserted between the two U-legs 16 and 17 so that these U-legs partially project over the disk-like surfaces 2 and 3 of the inner panel 4.

The luminaire 1 may include an information carrier 7 formed by information panels 22 and 23 positioned between the inner panel 4 and the outer panels 8 and 9. In this way, the inner panel 4 is arranged centrally in the frame member 10, and the information panels 22 and 23 are arranged on both sides of the inner panel 4, followed by outer panels 8 and 9, which are arranged on exposed sides of the information panels 22 and 23. The information carrier 7 is formed by arranging a pictograph on one side of the respective information panels 22 and 23. The inner surfaces 24 of the outer panels 8 and 9 are adjacent the information panels 22 and 23 or to corresponding disk-like surfaces 2 and 3 of the inner panel.

The inner panel 4; outer panels 8 and 9; the information panels 22 and 23 (if they are used); and the frame member 10 may be adhered to each other during assembly. The outer panels 8 and 9 are designed to precisely cover the opening formed in the frame member 10 and to contact corresponding U-legs 16 and 17 from the outside. The outer panels 8 and 9 also may be adhered to U-legs 16 and 17 formed in the frame member 10.

In order to be able to arrange the various panels flush in the frame member 10, a thickness 33 of the frame member 10 is substantially equal to the sum of thicknesses 34, 35, and 36 of the inner panel 4; the thicknesses 36 of the information panels 22 and 23; and the thicknesses 35 of the outer panels 8 and 9. Furthermore, the width of the U-shaped carrier 18 is somewhat smaller than the thickness 33 of the frame member 10. In this manner, the outer panels 8 and 9 may be arranged flush in the frame member 10 because the difference between the width of the U-shaped carrier 18 and the thickness of the frame member 10 basically corresponds to the thickness of the two outer panels 8 and 9.

The luminaire 1 may be attached, for example, to a ceiling using connection bolts 29 and 30. The connection bolts 29 and 30 are inserted into and attached at corresponding bores 31 and 32 along an upper side edge 28 of the frame member 10. The connection bolts 29 and 30, upon penetration through the upper side edge 28, are in contact with a substantially strip-shaped printed circuit board 15 (FIG. 3) on which the LEDs 6 are arranged. The connection bolts 29 and 30 and the luminaire 1 are suspended by wire-shaped suspension element 25 that connect to the bolts 29 and 30. The suspension element 25 includes two wire ropes 26 and 27, each of which is connected to the respective connection bolt 29 and 30. An electrical supply for the printed circuit board 15 and the LEDs 6 may be implemented through the wire ropes 26 and 27. As shown in FIG. 3, the strip-shaped printed circuit board 15 with LEDs 6 arranged thereon can be viewed between the U-legs 16 and 17. The U-legs 16 and 17 are in contact on ends of the printed circuit board 15 with the connection bolts 29 and 30.

The LEDs may be white LEDs. Alternatively, some of the LEDs may be colored. The color for the LED may correspond to the color of the pictographs used in the information carrier so that, for example, in a green pictograph, green LEDs may be used in addition to the white LEDs.

The various panels may be attached to each other by heating the inner surfaces 24 of the outer panels 8 and 9 to such an extent that the surfaces 24 become soft or liquid to be welded to the remaining panels 4, 22, and 23. Alternatively, or additionally, the surfaces of the information panels 22 and 23 and/or the inner panel 4 may be softened or liquefied.

By this full-surface connection of the various panels, air is excluded from the region between the panels, which leads to the impression that the luminaire 1 has a compact and one-piece panel. Moreover, a water-tight encapsulation among the panels and within the electric means of the luminaire, such as the printed circuit board 15 and the LEDs 6, is obtained by the full-surface connection.

Other implementations are within the scope of the following claims.

For example, in another implementation, the information carrier may be formed as a pictograph foil inserted between the outer panels 8 and 9 and the information panels 22 and 23 or between the outer panels 8 and 9 and the inner panel 4 (if the information panels 22 and 23 are not used). Alternatively, the information carrier 7 may be formed as a pictograph that is arranged on outer surfaces of the outer panels 8 and 9, without the use of the information panels 22 and 23.

What is claimed is:

1. A luminaire comprising:
   a frame member;
   an inner panel having two surfaces and edges that join the surfaces, the inner panel being able to reflect light substantially perpendicularly to its surfaces;
   light emitting diodes (LEDs) arranged along at least one edge of the inner panel and detachably attached to the frame member;
   an information carrier associated with at least one surface of the inner panel; and
   two outer panels associated with the two surfaces of the inner panel;
   wherein:
   the inner panel and two outer panels are held by the frame member for water-tight encapsulation,
   the frame member includes a U-shaped carrier having U-legs, and
   the LEDs are arranged between the U-legs such that, when the inner panel is held by the frame member, the U-legs partially project over the inner panel.

2. A luminaire as claimed in claim 1 in which the inner panel includes a light reflector along at least one of its edges not facing the LEDs.

3. A luminaire as claimed in claim 2 in which the light reflector includes reflectors.

4. A luminaire as claimed in claim 2 in which the light reflector includes a light-reflective adhesive band.

5. A luminaire as claimed in claim 1 in which the inner panel includes a transparent plastic panel.

6. A luminaire as claimed in claim 5 in which the inner panel is formed of acrylic resin.

7. A luminaire as claimed in claim 1 in which the LEDs are arranged on a substantially strip-shaped printed circuit board.

8. A luminaire as claimed in claim 7 further comprising a wire-shaped suspension element that is attached to the frame member to hang the frame member to a ceiling, in which a voltage supply for the LEDs is implemented through the suspension element.

9. A luminaire as claimed in claim 8 in which the suspension element includes two wire ropes that are able to be attached to a side edge of the frame member.

10. A luminaire as claimed in claim 9 in which the suspension element includes connecting bolts for attaching the wire ropes that are connected to the LED printed circuit board through two bores in a side edge of the frame member.

11. A luminaire as claimed in claim 1 in which the U-shaped carrier is covered on its open ends by the light reflector.

12. A luminaire as claimed in claim 1 in which the frame member is four-sided, and the U-shaped carrier is arranged along the edge of the frame member at which the LEDs are arranged.

13. A luminaire as claimed in claim 1 in which the frame member encompasses the inner panel and the outer panels along their edges.

14. A luminaire as claimed in claim 1 in which the information carrier is formed as a pictograph arranged on the outside of at least one outer panel.

15. A luminaire as claimed in claim 1 in which the information carrier is arranged as a foil pictograph between the inner and an outer panel.

16. A luminaire as claimed in claim 1 in which the information carrier includes an information panel having a pictograph between the inner and the outer panel.

17. A luminaire as claimed in claim 16 in which the inner panel, the two outer panels and the information panel are adhered to each other.

18. A luminaire as claimed in claim 16 in which the outer panels include inner surfaces that face the inner panel, and the inner surfaces are able to be heated until the inner surfaces are softened such that the outer panels are able to be welded to one or more of the inner panel and the information panel.

19. A luminaire as claimed in claim 16 in which the frame member and the inner panel, the two outer panels, and the information panel are formed of the same plastic material.

20. A luminaire as claimed in claim 1 in which the LEDs produce white light.

21. A luminaire as claimed in claim 1 in which at least one or more of the LEDs produce colored light.

22. A luminaire as claimed in claim 21 in which the LEDs that produce the colored light produce colored light that corresponds to a color of the information carrier.

23. A luminaire as claimed in claim 1 in which a thickness of the frame member corresponds substantially to the sum of thicknesses of the inner panel, the outer panels, and the information panel to provide positive arrangement in the frame member.

24. A luminaire comprising:
   a frame member having U-legs that extend inwardly from the frame member, each U-leg including an inner surface and an outer surface;
   an inner panel having two surfaces and edges that join the surfaces, the inner panel being able to reflect light substantially perpendicularly to its surfaces and the inner panel being held between the inner surfaces of the U-legs;

light emitting diodes arranged along at least one edge of the inner panel;

an information carrier associated with at least one surface of the inner panel; and two outer panels associated with the two surfaces of the inner panel, each outer panel contacting an outer surface of a U-leg, wherein the LEDs are arranged between the U-legs such that, when the inner panel is held by the frame member, the U-legs partially project over the inner panel.

25. The luminaire of claim 24 wherein the inner panel and outer panels are held by the frame member for water-tight encapsulation.

26. A method of making a luminaire, the method comprising:

arranging lights along at least one edge of an inner panel;

detachably attaching the lights to a frame member that includes a U-shaped carrier having U-legs;

associating an information carrier with at least one surface of the inner panel; and associating two outer panels with two surfaces of the inner panel including heating inner surfaces of the outer panels that face the inner panel until the inner surfaces of the outer panels are softened such that the outer panels are welded to the inner panel for water-tight encapsulation, wherein arranging the lights comprises arranging the lights between the U-legs such that, when the inner panel is held by the frame member, the U-legs partially project over the inner panel.

27. The method of claim 26 wherein associating an information carrier with at least one surface of the inner panel includes inserting an information panel between the inner panel and the outer panel.

* * * * *